United States Patent
Chiu et al.

(10) Patent No.: US 12,117,699 B1
(45) Date of Patent: Oct. 15, 2024

(54) MANUFACTURING METHOD OF DISPLAY PANEL AND ETCHING SOLUTION

(71) Applicant: HANNSTAR DISPLAY CORPORATION, Taipei (TW)

(72) Inventors: Li-Fang Chiu, Tainan (TW); Ching-Chieh Lee, Kaohsiung (TW); Chun-Chieh Wang, Tainan (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 18/637,483

(22) Filed: Apr. 17, 2024

(30) Foreign Application Priority Data

Aug. 31, 2023 (TW) ................................. 112132923

(51) Int. Cl.
| | | |
|---|---|---|
| *G02F 1/1333* | (2006.01) | |
| *G02F 1/1335* | (2006.01) | |
| *G02F 1/1337* | (2006.01) | |
| *G02F 1/1343* | (2006.01) | |
| *G02F 1/1362* | (2006.01) | |
| *G02F 1/1368* | (2006.01) | |

(52) U.S. Cl.
CPC .... *G02F 1/13439* (2013.01); *G02F 1/133792* (2021.01); *G02F 1/1333* (2013.01); *G02F 1/133553* (2013.01); *G02F 1/136227* (2013.01); *G02F 1/1368* (2013.01)

(58) Field of Classification Search
CPC ............. G02F 1/1333; G02F 1/133345; G02F 1/1335; G02F 1/133553; G02F 1/133792; G02F 1/1343; G02F 1/13439; G02F 1/1362; G02F 1/136227; G02F 1/1368
See application file for complete search history.

(56) References Cited

U.S. PATENT DOCUMENTS

2005/0190322 A1   9/2005  Okabe

FOREIGN PATENT DOCUMENTS

| JP | 2004-176115 | 6/2004 |
|---|---|---|
| TW | 200408729 | 6/2004 |
| TW | I478347 | 3/2015 |
| TW | 202003922 | 1/2020 |
| TW | 202013524 A | 4/2020 |

OTHER PUBLICATIONS

Chiu, the specification, including the claims, and drawings in the U.S. Appl. No. 18/381,169, Filing Date: Oct. 17, 2023.

*Primary Examiner* — Thoi V Duong
(74) *Attorney, Agent, or Firm* — Winston Hsu

(57) ABSTRACT

This invention discloses an etching solution and a manufacturing method of a display panel. The method includes following steps: providing a substrate; forming a conductive layer stack including a first sub-layer, a second sub-layer and a third sub-layer on the substrate, the first sub-layer includes molybdenum, the second sub-layer is disposed on the first sub-layer and includes a transparent conductive material including indium-containing oxide, the third sub-layer is disposed between the first sub-layer and the second sub-layer and includes silver or silver alloy; performing an etching process, the first sub-layer, the second sub-layer and the third sub-layer are etched by an etching solution to form a first patterned sub-layer, a second patterned sub-layer and a third patterned sub-layer. The etching solution includes 1 to 3 wt % of nitric acid, 30 to 50 wt % of acetic acid, 30 to 50 wt % of phosphoric acid and a remaining amount of water.

13 Claims, 15 Drawing Sheets

MANUFACTURING METHOD OF DISPLAY PANEL AND ETCHING SOLUTION

BACKGROUND OF THE INVENTION

1. Field of the Invention

The present invention relates to a manufacturing method of a display panel and an etching solution, and more particularly, to a manufacturing method of a display panel and an etching solution for forming a high-quality reflective electrode.

2. Description of the Prior Art

Among different types of display panels, reflective display panels or transflective display panels have the advantage of low power consumption because the ambient light is utilized as the light source for achieving the display effect. At present, reflective or transflective display panels are applied in many electronic products such as writing boards, electronic papers, tablet PCs, laptops, etc., and improving the display quality of reflective or transflective display panels is one of the purposes of the present invention.

SUMMARY OF THE INVENTION

The technical problem to be solved by the present invention is forming high-quality reflective electrodes and improving the display quality of the display panel.

In order to solve the above technical problems, the present invention provides a manufacturing method of a display panel including following steps: providing a substrate; forming a conductive layer stack on the substrate; forming a photoresist pattern on the conductive layer stack; and performing an etching process on the conductive layer stack. The conductive layer stack includes a first sub-layer, a second sub-layer, and a third sub-layer. The first sub-layer includes molybdenum. The second sub-layer is disposed on the first sub-layer and includes a transparent conductive material, and the transparent conductive material includes indium-containing oxide. The third sub-layer is disposed between the first sub-layer and the second sub-layer and includes silver or silver alloy. An etching solution is used for etching the first sub-layer, the second sub-layer, and the third sub-layer in the etching process to form a first patterned sub-layer, a second patterned sub-layer, and a third patterned sub-layer. The etching solution includes 1 to 3 wt % of nitric acid, 30 to 50 wt % of acetic acid, 30 to 50 wt % of phosphoric acid, and a remaining amount of water.

In order to solve the above technical problems, the present invention provides an etching solution used for performing an etching process on a conductive layer stack of a display panel to form a patterned conductive layer stack. The etching solution includes 1 to 3 wt % of nitric acid; 30 to 50 wt % of acetic acid; 30 to 50 wt % of phosphoric acid; and a remaining amount of water. The conductive layer stack includes a first sub-layer, a second sub-layer, and a third sub-layer, and the third sub-layer is disposed between the first sub-layer and the second sub-layer. The patterned conductive layer stack includes a first patterned sub-layer, a second patterned sub-layer, and a third patterned sub-layer, and the third patterned sub-layer is disposed between the first patterned sub-layer and the second patterned sub-layer. The first sub-layer, the second sub-layer, and the third sub-layer are etched by the etching solution in the etching process to form the first patterned sub-layer, the second patterned sub-layer, and the third patterned sub-layer. The first sub-layer and the first patterned sub-layer include molybdenum. The second sub-layer and the second patterned sub-layer include a transparent conductive material, and the transparent conductive material includes indium-containing oxide. The third sub-layer and the third patterned sub-layer include silver or silver alloy.

In the manufacturing method of the display panel of the present invention, the etching solution can be used for etching the conductive layer stack to form the reflective electrode. The etching process is one-step etching, and the etching process etches the first sub-layer (including molybdenum), the second sub-layer (including indium-containing oxide), and the third sub-layer (including silver or silver alloy) together to form the patterned conductive layer stack. Through the etching process of the present invention and disposing the first sub-layer containing molybdenum under the third sub-layer containing silver, the damage of the edge of the silver layer of the patterned conductive layer stack can be effectively suppressed, and the silver particles on the edge of the patterned conductive layer stack can also be effectively suppressed, and these can improve the reflection effect of the reflective electrode and further improve the display quality of the display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
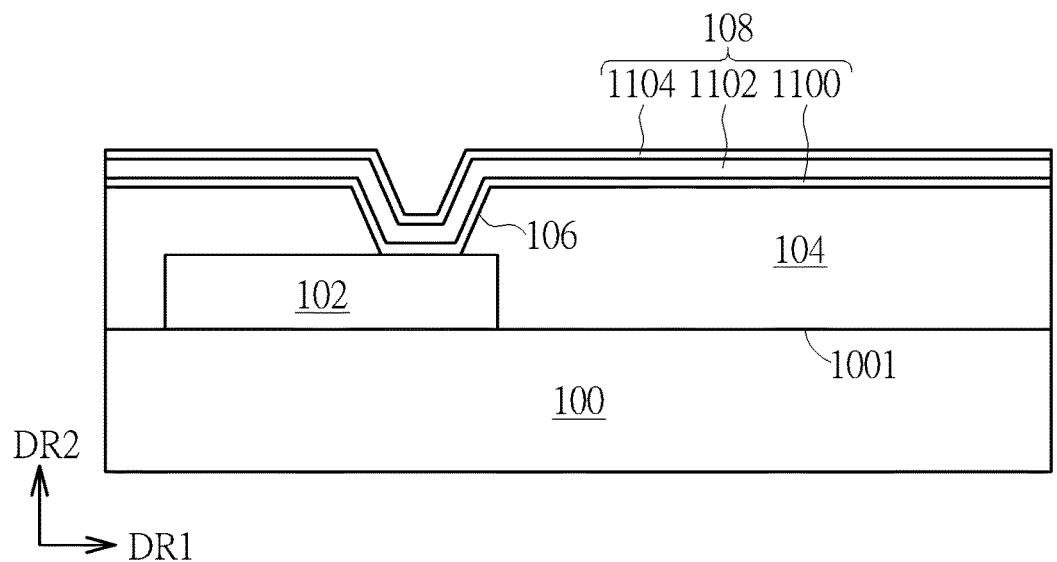
FIG. 1 is a schematic diagram illustrating a step of forming a conductive layer stack in a manufacturing method of a display panel according to a first embodiment of the present invention.

To provide a better understanding of the present invention to those skilled in this field, preferred embodiments will be detailed as follows. The preferred embodiments of the present invention are illustrated in the accompanying drawings to elaborate on the contents and effects to be achieved. It should be noted that the drawings are simplified schematics, and therefore show only the components and combinations associated with the present invention, to provide a clearer description of the basic architecture or method of implementation. The components would be complex in reality. In addition, for ease of explanation, the components shown in the drawings may not represent their actual number, shape, and dimensions; details can be adjusted according to design requirements.

A direction DR1 and a direction DR2 are shown in the following drawings. The direction DR2 may be a normal direction or a top view direction, and the direction DR2 can be perpendicular to a top surface 1001 of a substrate 100 as shown in FIG. 1. The direction DR1 may be a horizontal direction and perpendicular to the direction DR2. As shown in FIG. 1, the direction DR1 can be parallel to the top surface 1001 of the substrate 100. The spatial relationship of structures can be described according to the directions DR1 and DR2 in the following drawings.

Figure 2:
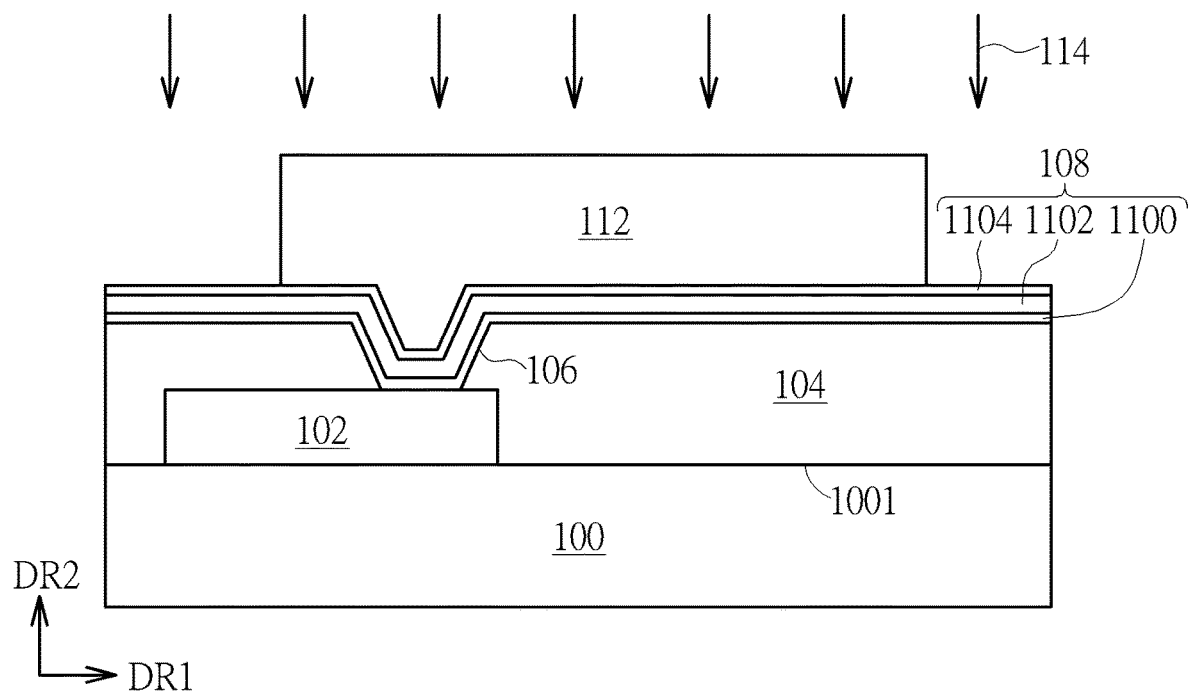
FIG. 2 is a schematic diagram illustrating steps of forming a photoresist pattern and performing an etching process in the manufacturing method of the display panel according to the first embodiment of the present invention.
Figure 3:
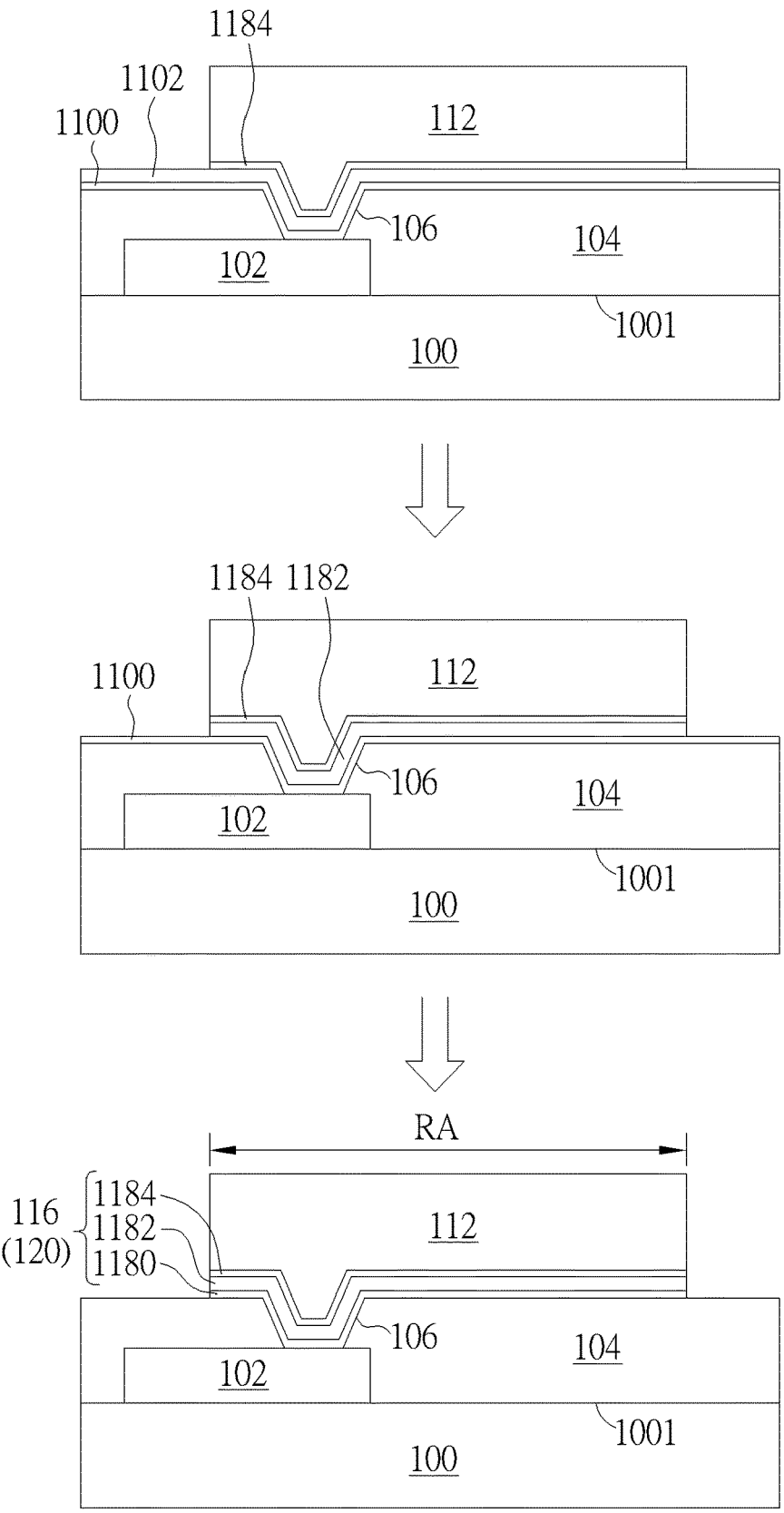
FIG. 3 is a schematic diagram illustrating forming a reflective electrode by three-step etching.
Figure 4:
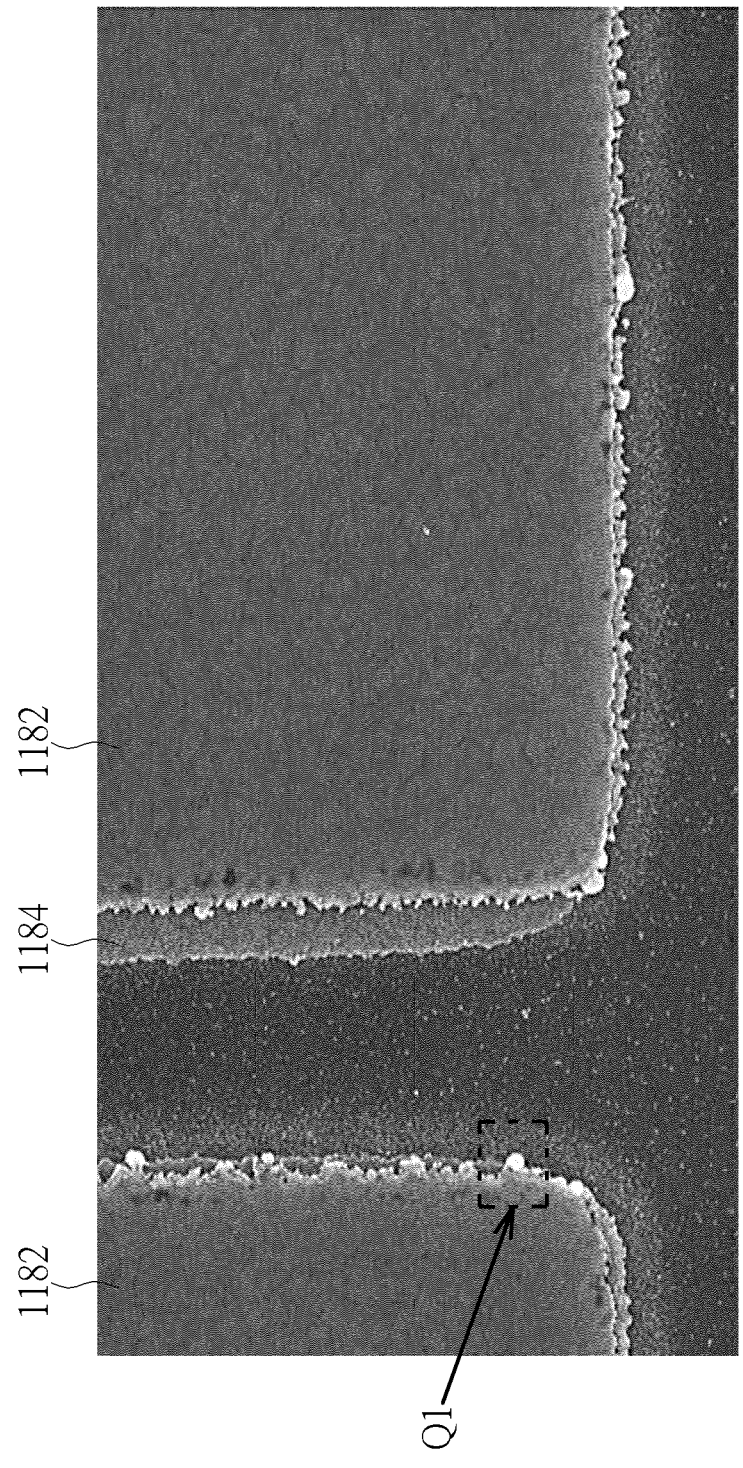
FIG. 4 is a partially enlarged top view diagram illustrating the reflective electrodes formed by three-step etching.
Figure 5:
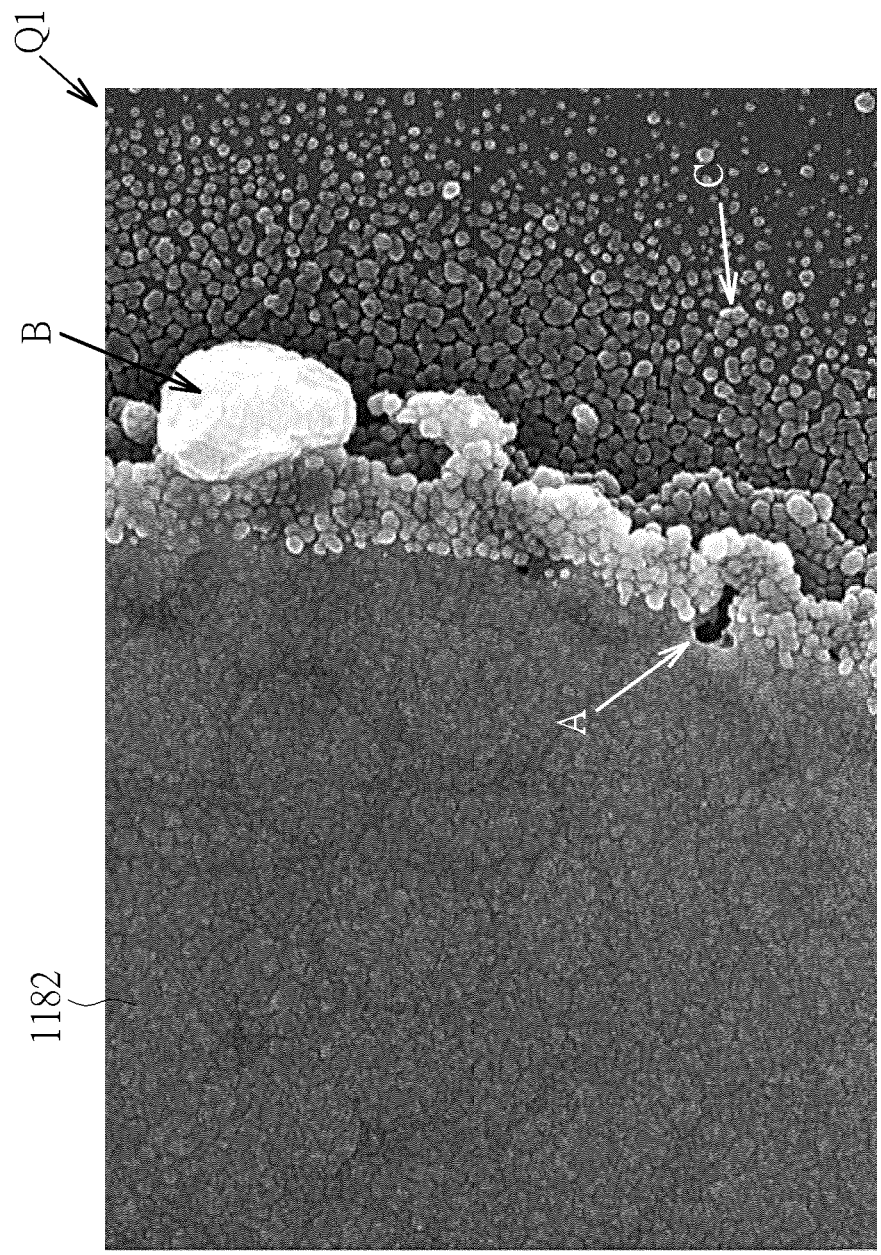
FIG. 5 is an enlarged diagram illustrating a region Q1 in FIG. 4.
Figure 6:
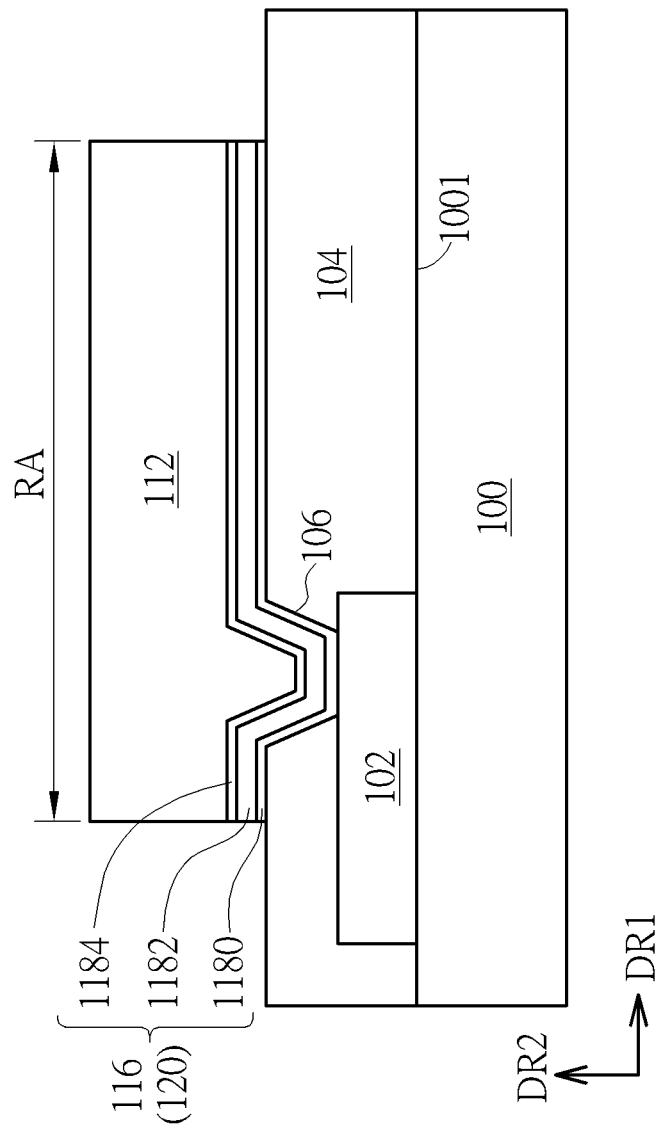
FIG. 6 is a schematic diagram illustrating forming a reflective electrode by one-step etching in the manufacturing method of the display panel according to the first embodiment of the present invention.
Figure 7:
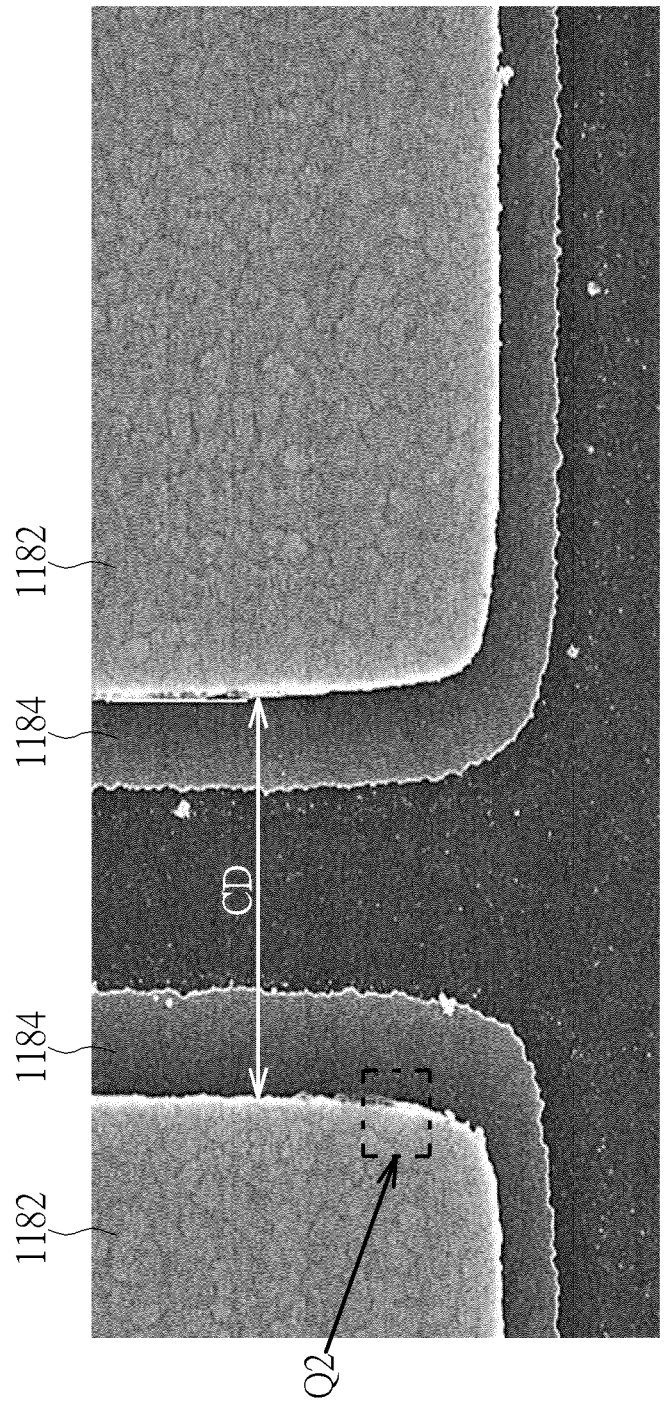
FIG. 7 is a partially enlarged top view diagram illustrating the reflective electrodes formed by one-step etching in the manufacturing method of the display panel according to the first embodiment of the present invention.
Figure 8:
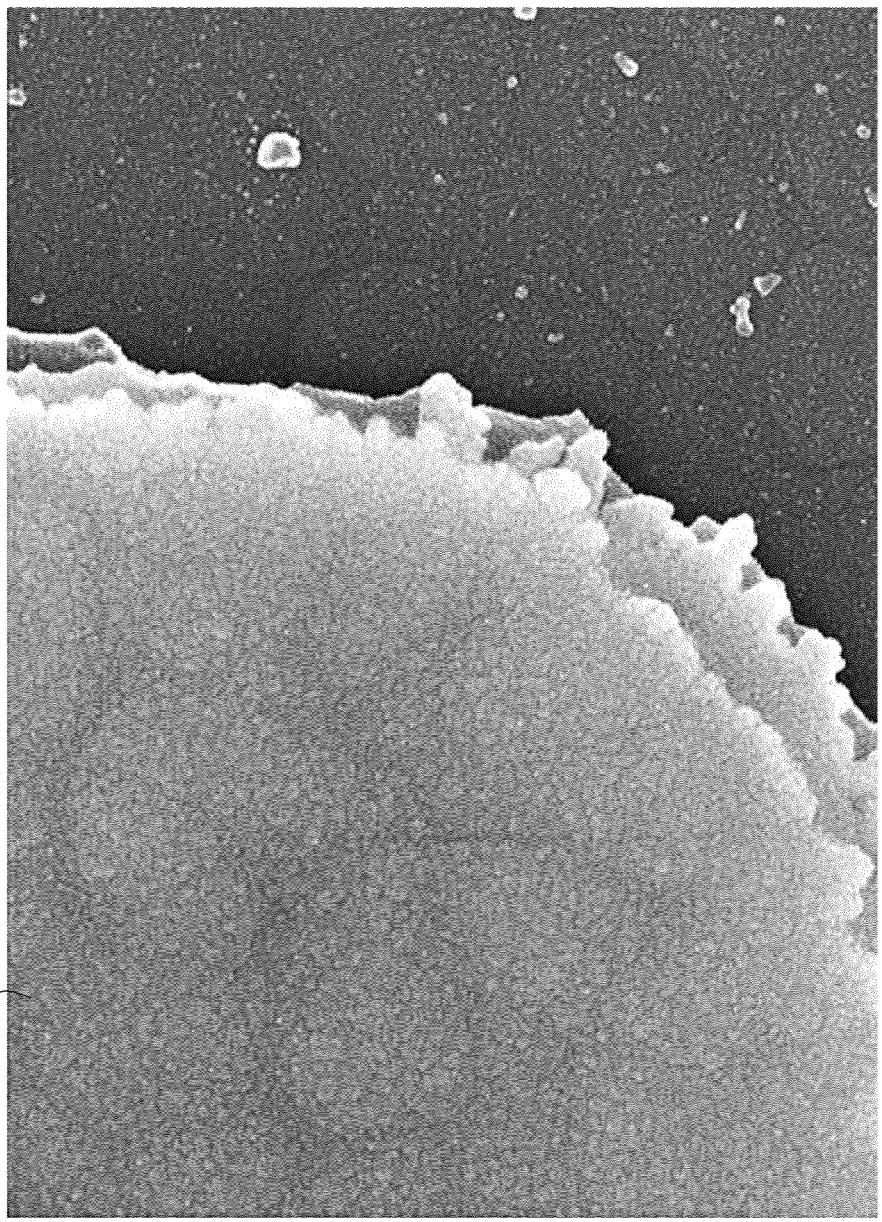
FIG. 8 is an enlarged diagram illustrating a region Q2 in FIG. 7.
Figure 9:
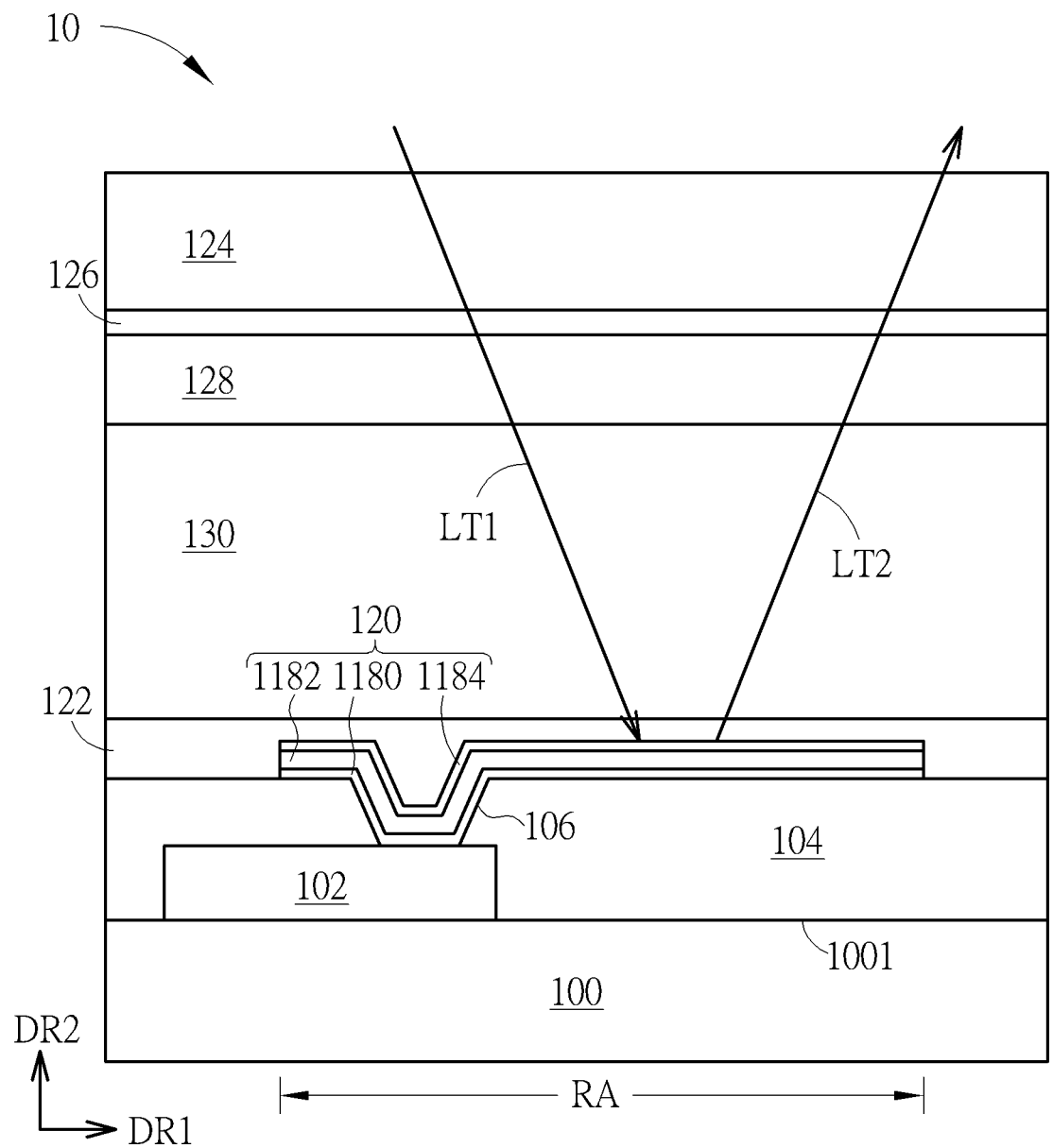
FIG. 9 is a schematic diagram illustrating a step of forming a first alignment layer and the remaining components in the manufacturing method of the display panel according to the first embodiment of the present invention.
Figure 10:
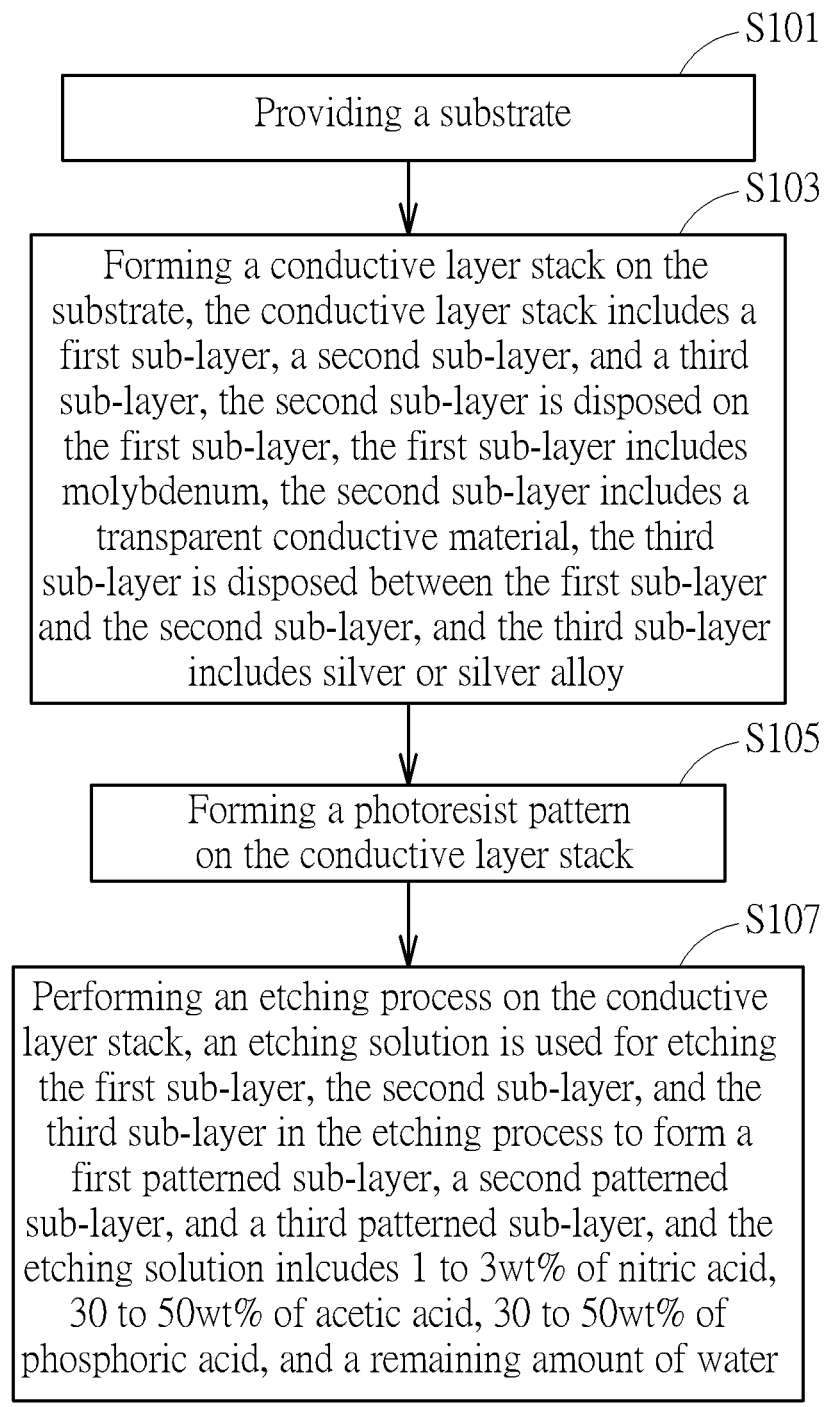
FIG. 10 is a flow chart of the manufacturing method of the display panel according to the first embodiment of the present invention.

Referring to FIG. 1 to FIG. 10, FIG. 1 is a schematic diagram illustrating a step of forming a conductive layer stack in a manufacturing method of a display panel according to a first embodiment of the present invention, FIG. 2 is a schematic diagram illustrating steps of forming a photoresist pattern and performing an etching process in the manufacturing method of the display panel according to the first embodiment of the present invention, FIG. 3 is a schematic diagram illustrating forming a reflective electrode by three-step etching, FIG. 4 is a partially enlarged top view diagram illustrating the reflective electrode formed by three-step etching, FIG. 5 is an enlarged diagram illustrating a region Q1 in FIG. 4, FIG. 6 is a schematic diagram illustrating forming a reflective electrode by one-step etching in the manufacturing method of the display panel according to the first embodiment of the present invention, FIG. 7 is a partially enlarged top view diagram illustrating the reflective electrode formed by one-step etching in the manufacturing method of the display panel according to the first embodiment of the present invention, FIG. 8 is an enlarged diagram illustrating a region Q2 in FIG. 7, FIG. 9 is a schematic diagram illustrating a step of forming a first alignment layer and the remaining components in the manufacturing method of the display panel according to the first embodiment of the present invention, and FIG. 10 is a flow chart of the manufacturing method of the display panel according to the first embodiment of the present invention.

It should be understood that the steps shown in FIG. 10 may not be complete, and other steps may be performed before, after, or between the shown steps. In addition, some steps may be performed simultaneously or in a different order from that shown in FIG. 10.

As shown in FIG. 1 and FIG. 10, firstly, a step S101 can be performed to provide a substrate 100. A thin film transistor 102 and an insulating layer 104 are formed on the substrate 100, and the insulating layer 104 covers the thin film transistor 102. The substrate 100 may include a rigid substrate such as a glass substrate, a plastic substrate, a quartz substrate, or a sapphire substrate, but not limited thereto. The substrate 100 may also include a flexible substrate such as a polyimide (PI) substrate or a polyethylene terephthalate (PET) substrate, but not limited thereto. The insulating layer 104 may include an inorganic insulating material, an organic insulating material, or a combination thereof, but not limited thereto. The insulating layer 104 may include a single-layer structure or a multi-layer structure.

Next, a through hole 106 is formed in the insulating layer 104. Next, a step S103 can be performed to form a conductive layer stack 108 on the substrate 100. Furthermore, the conductive layer stack 108 can be disposed on the insulating layer 104 and extend into the through hole 106 to electrically connect with the thin film transistor 102, and the conductive layer stack 108 includes a first sub-layer 1100, a second sub-layer 1104, and a third sub-layer 1102. The second sub-layer 1104 is disposed on the first sub-layer 1100, and the third sub-layer 1102 is disposed between the first sub-layer 1100 and the second sub-layer 1104.

In this embodiment, the first sub-layer 1100 can directly contact the third sub-layer 1102 (e.g., a top surface of the first sub-layer 1100 directly contacts a bottom surface of the third sub-layer 1102), and the third sub-layer 1102 can directly contact the second sub-layer 1104 (e.g., a bottom surface of the second sub-layer 1104 directly contacts a top surface of the third sub-layer 1102), but not limited thereto. The first sub-layer 1100 may be a metal layer, the second sub-layer 1104 may be a transparent conductive layer, and the third sub-layer 1102 may be a metal layer. A method of forming the conductive layer stack 108 may include sequentially forming the first sub-layer 1100, the third sub-layer 1102, and the second sub-layer 1104 on the insulating layer 104. The conductive layer stack 108 can be electrically connected to the thin film transistor 102 via the through hole 106.

The first sub-layer 1100 may include metal, such as molybdenum, but not limited thereto. The second sub-layer 1104 may include the transparent conductive material, and the transparent conductive material includes indium-containing oxide. For example, the indium-containing oxide may include indium tin oxide (ITO) or indium zinc oxide (IZO), but not limited thereto. The third sub-layer 1102 may include metal, such as silver or silver alloy, but not limited thereto. Therefore, the materials of the first sub-layer 1100, the third sub-layer 1102 and the second sub-layer 1104 may be different from each other.

Since the third sub-layer 1102 is silver or silver alloy, the adhesion between the third sub-layer 1102 and the insulating layer 104 may be poor and easy to peel off, and therefore the first sub-layer 1100 is further disposed between the third sub-layer 1102 and the insulating layer 104 in this embodiment. The first sub-layer 1100 is molybdenum, and the first sub-layer 1100 directly contacts the insulating layer 104 (e.g., the bottom surface of the first sub-layer 1100 directly contacts the insulating layer 104), thereby reducing the peeling phenomenon of the third sub-layer 1102.

In addition, since the material of the third sub-layer 1102 can be metal, if the conductive layer stack 108 does not include a layer covering the third sub-layer 1102 (such as the second sub-layer 1104), the surface of the third sub-layer 1102 may react with external substances during the period waiting for the subsequent process (such as the period after the conductive layer stack 108 is formed and before the patterning process of the conductive layer stack 108) and/or during the subsequent process (such as the patterning process of the conductive layer stack 108). For example, in the embodiment where the material of the third sub-layer 1102 includes silver or silver alloy, silver easily reacts with external substances to cause discoloration and/or decrease in reflectivity. Therefore, in the process of forming the conductive layer stack 108 and after the third sub-layer 1102 is formed, the second sub-layer 1104 including the transparent conductive material is formed on the third sub-layer 1102 to protect the third sub-layer 1102 and to prevent the third sub-layer 1102 from reacting with external substances during the waiting period and/or the following process.

As shown in FIG. 2, a step S105 can be performed to form a photoresist pattern 112 on the conductive layer stack 108. The photoresist pattern 112 covers a portion of the conductive layer stack 108 and overlaps the through hole 106. Next, a step S107 can be performed to perform an etching process 114 on the conductive layer stack 108 through the photoresist pattern 112, and an etching solution is used in the etching process 114 for etching the first sub-layer 1100, the second sub-layer 1104, and the third sub-layer 1102 to form a patterned conductive layer stack 116 (shown in FIG. 3 and FIG. 6).

Next, the comparison results of forming the patterned conductive layer stack 116 by two different etching processes 114 (the three-step etching process as shown in FIG. 3 to FIG. 5 and the one-step etching process as shown in FIG. 6 to FIG. 8) in the present invention will be described.

As shown in FIG. 3, the first sub-layer 1100, the second sub-layer 1104, and the third sub-layer 1102 can be etched by three etching steps respectively in the first type of etching process from top to bottom in FIG. 3. As shown in the top diagram in FIG. 3, the second sub-layer 1104 is etched to form a second patterned sub-layer 1184 first. Next, as shown in the middle diagram in FIG. 3, the third sub-layer 1102 is etched to form a third patterned sub-layer 1182. Then, as shown in the bottom diagram in FIG. 3, the first sub-layer 1100 is etched to form a first patterned sub-layer 1180.

As shown in FIG. 3, the patterned conductive layer stack 116 can include the first patterned sub-layer 1180, the second patterned sub-layer 1184, and the third patterned sub-layer 1182. In this embodiment, the patterned conductive layer stack 116 is located in a reflective region RA of the display panel and serves as the reflective electrode 120, but not limited thereto.

As shown in FIG. 4, FIG. 4 is a partially enlarged top view diagram illustrating the reflective electrodes 120 formed from the etching processes of FIG. 3. FIG. 5 is an enlarged diagram illustrating a region Q1 in FIG. 4. The reflective electrodes 120 of two pixels (or two sub-pixels) respectively are located on the left and right in FIG. 4. In FIG. 4 and FIG. 5, the first patterned sub-layer 1180 is blocked by the third patterned sub-layer 1182, thus the first patterned sub-layer 1180 does not appear in FIG. 4 and FIG. 5. In some embodiments, the first patterned sub-layer 1180, the third patterned sub-layer 1182, and the second patterned sub-layer 1184 of the reflective electrode 120 respectively include indium tin oxide, silver, and indium tin oxide. In some embodiments, the first patterned sub-layer 1180, the third patterned sub-layer 1182, and the second patterned sub-layer 1184 of the reflective electrode 120 respectively include molybdenum, silver, and indium tin oxide.

When the etching process 114 etches the first sub-layer 1100, the second sub-layer 1104, and the third sub-layer 1102 through three etching steps respectively to form the patterned conductive layer stack 116, some positions in the third patterned sub-layer 1182 (i.e., the silver layer) near the edge may be damaged (as indicated by an arrow A in FIG. 5), or silver particles may be formed at positions near the edge of the third patterned sub-layer 1182 (as indicated by an arrow B in FIG. 5), or silver particles may diffuse out of the third patterned sub-layer 1182 (as indicated by an arrow C in FIG. 5). These phenomena decrease the reflection effect of the reflective electrode 120, or produce gray spots in the displayed image, or decrease the product yield.

In order to solve the shortcomings of the first type of etching process mentioned above, the inventors conducted experiments on etching solutions having different composition ratios and obtained an etching solution suitable for etching the first sub-layer 1100, the second sub-layer 1104, and the third sub-layer 1102. When this etching solution is used for etching the first sub-layer 1100, the second sub-layer 1104, and the third sub-layer 1102 and when molybdenum is used as the material of the first sub-layer 1100, the reflective electrode 120 may not have the problems of damages at the silver layer's edge and silver particles in the reflective electrode 120 caused by the first etching process (i.e., etching indium tin oxide, silver, and indium tin oxide or molybdenum, silver, and indium tin oxide by three etching steps respectively). Next, the etching solution and the etching method used in the second type of etching process will be described in detail (as shown in FIG. 6 to FIG. 8).

In the second type of etching process, as shown in FIG. 2 and FIG. 6, the present invention provides an etching solution, the etching solution can be used for etching the first sub-layer 1100, the second sub-layer 1104, and the third sub-layer 1102 of the conductive layer stack 108 to form the first patterned sub-layer 1180, the second patterned sub-layer 1184, and the third patterned sub-layer 1182. The first patterned sub-layer 1180 includes molybdenum, the second patterned sub-layer 1184 includes indium-containing oxide (such as indium tin oxide or indium zinc oxide), and the third patterned sub-layer 1182 includes silver or silver alloy. Based on the total weight of the etching solution, the etching solution includes 1 to 3 wt % of nitric acid, 30 to 50 wt % of acetic acid, 30 to 50 wt % of phosphoric acid, and the remaining amount of water. The etching solution of the present invention only includes nitric acid, acetic acid, phosphoric acid and water, and no other components are added, that is, the etching solution of the present invention is composed of nitric acid, acetic acid, phosphoric acid, and water.

The water used in the etching solution can be deionized water. In addition, the temperature of the etching solution used in the etching process 114 is greater than or equal to 26 degrees Celsius and less than or equal to 35 degrees Celsius. In the present invention, the first sub-layer 1100, the second sub-layer 1104, and the third sub-layer 1102 are together etched in one step by the etching process 114 (as shown in FIG. 2) with the etching solution to form the first patterned sub-layer 1180, the second patterned sub-layer 1184, and the third patterned sub-layer 1182 of FIG. 6. Thus, the etching process 114 etches the conductive layer stack 108 in one step (or so-called as the one-step etching process).

In the etching process 114 of this embodiment, the above etching solution can be coated on the conductive layer stack 108 and the photoresist pattern 112 of FIG. 2 by an etching machine for example. A portion of the conductive layer stack 108 is not covered by the photoresist pattern 112, and this portion is removed by the above etching solution. Another portion of the conductive layer stack 108 is covered by the photoresist pattern 112, and this portion is not removed and forms the patterned conductive layer stack 116. However, the etching method of the etching process 114 of the present invention is not limited to this.

In the present invention, the proportion range of acetic acid in the etching solution is increased to be the same as the proportion range of phosphoric acid in the etching solution. The proportion range of acetic acid and the proportion range of phosphoric acid in the etching solution are both 30 to 50 wt %, the proportion range of nitric acid in the etching solution is decreased to 1 to 3 wt %, and the etching uniformity can therefore be improved and the flatness of the edge of the reflective electrode 120 formed after the etching process can also be improved, thereby improving the display quality of the display panel, but the present invention is not limited thereto.

In addition, the etching solution of the invention is composed of nitric acid, acetic acid, phosphoric acid and water, and no other components need to be added, thus the preparation of the etching solution can be simplified, and the cost of production monitoring can be reduced since only the contents of nitric acid, acetic acid, and phosphoric acid in the etching solution should be monitored and checked with the standards of the production process.

As shown in FIG. 7 and FIG. 8, FIG. 7 is a partially enlarged top view diagram illustrating the reflective electrodes 120 which is formed by one-step etching with the etching solution in the present invention, and FIG. 8 is an enlarged diagram illustrating a region Q2 in FIG. 7. The first patterned sub-layer 1180, the third patterned sub-layer 1182, and the second patterned sub-layer 1184 of the reflective electrode 120 respectively include molybdenum, silver, and indium tin oxide. In FIG. 7 and FIG. 8, the first patterned sub-layer 1180 is blocked by the third patterned sub-layer 1182, and therefore the first patterned sub-layer 1180 does not appear in FIG. 7 and FIG. 8.

It is obvious from FIG. 7 and FIG. 8 that the edge of the reflective electrode 120 may not have the phenomena of damages in the silver layer and the existence of silver particles when the etching solution of the present invention is used in the etching process 114 to etch the first sub-layer 1100, the second sub-layer 1104, and the third sub-layer 1102 in one step to form the reflective electrode 120. In addition, the reflective effect of the reflective electrode 120 can be improved, thereby improving the display quality and yield of the display panel.

The data obtained through experiments by the inventors is described herein. First, the second type of etching process is carried out with the etching solutions at different temperatures within a certain period (e.g., 1 minute). In one of the experiments, the temperature of the etching solution is 26 degrees Celsius, a distance CD (as shown in FIG. 7) between two adjacent third patterned sub-layers 1182 (silver layers) after the etching process can be about 5.85 micrometers, and the difference between the distances between two adjacent third patterned sub-layers 1182 before and after the etching process can be about 3.85 micrometers. The distance between two adjacent third patterned sub-layers 1182 before the etching process may be a distance between two adjacent photoresist patterns 112, but not limited thereto.

In one of the experiments, the temperature of the etching solution is 30 degrees Celsius, the distance CD between two adjacent third patterned sub-layers 1182 after the etching process can be about 6.12 micrometers, and the difference between the distances between two adjacent third patterned sub-layers 1182 before and after the etching process can be about 4.12 micrometers. In one of the experiments, the temperature of the etching solution is 35 degrees Celsius, the distance CD between two adjacent third patterned sub-layers 1182 after the etching process can be about 8.24 micrometers, and the difference between the distances between two adjacent third patterned sub-layers 1182 before and after the etching process can be about 6.24 micrometers.

Furthermore, the above second type of etching process is carried out with the etching solution at a fixed temperature (e.g., 30 degrees Celsius) in different time periods. In one of the experiments, the time period is 35 seconds, the distance CD between two adjacent third patterned sub-layers 1182 after the etching process can be about 5.85 micrometers, and the difference between the distances between two adjacent third patterned sub-layers 1182 before and after the etching process can be about 3.35 micrometers. In one of the experiments, the time period is 39 seconds, the distance CD between two adjacent third patterned sub-layers 1182 after the etching process can be about 6.12 micrometers, and the difference between the distances between two adjacent third patterned sub-layers 1182 before and after the etching process can be about 3.62 micrometers.

In one of the experiments, the time period is 43 seconds, the distance CD between two adjacent third patterned sub-layers 1182 after the etching process can be about 7.47 micrometers, and the difference between the distances between two adjacent third patterned sub-layers 1182 before and after the etching process can be about 3.97 micrometers. In one of the experiments, the time period is 63 seconds, the distance CD between two adjacent third patterned sub-layers 1182 after the etching process can be about 9.19 micrometers, and the difference between the distances between two adjacent third patterned sub-layers 1182 before and after the etching process can be about 5.19 micrometers.

In short, the above second type of etching process is used as the etching process 114 in the step S107 of the manufacturing method of the display panel according to the first embodiment of the present invention. The present invention provides an etching solution, and the etching solution includes 1 to 3 wt % of nitric acid, 30 to 50 wt % of acetic acid, 30 to 50 wt % of phosphoric acid, and a remaining amount of water. In the etching process 114, the first sub-layer 1100, the second sub-layer 1104, and the third sub-layer 1102 are etched together by the above etching solution to form the first patterned sub-layer 1180, the second patterned sub-layer 1184, and the third patterned sub-layer 1182. The first patterned sub-layer 1180 includes molybdenum, the second patterned sub-layer 1184 includes indium-containing oxide (such as indium tin oxide or indium zinc oxide), and the third patterned sub-layer 1182 includes silver or silver alloy. The etching process 114 in the step S107 of the manufacturing method of the display panel according to the first embodiment of the present invention etches the conductive layer stack 108 in one step (or so-called as the one-step etching process).

In addition, the temperature of the etching solution used in the etching process 114 can be greater than or equal to 26 degrees Celsius and less than or equal to 35 degrees Celsius, the time period of the etching process 114 can be greater than or equal to 35 seconds and less than or equal to 63 seconds, the distance CD between two adjacent third patterned sub-layers 1182 after the etching process 114 can be greater than or equal to 5.85 micrometers and less than or equal to 9.19 micrometers, and the difference between the distances between two adjacent third patterned sub-layers 1182 before and after the etching process 114 can be greater than or equal to 3.35 micrometers and less than or equal to 6.24 micrometers, but not limited thereto.

Figure 11:
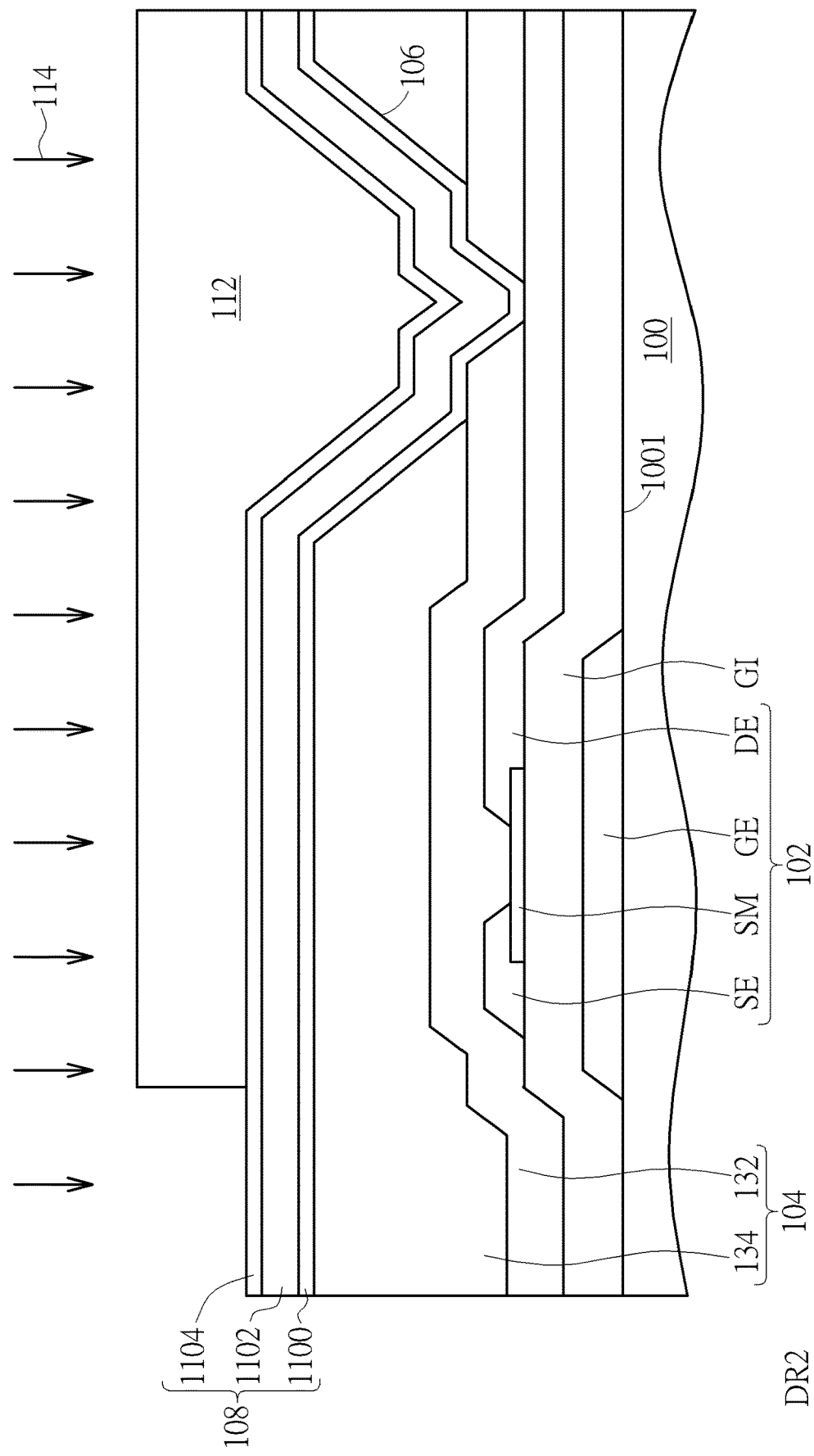
FIG. 11 and FIG. 12 are schematic diagrams illustrating an example of forming the reflective electrode according to the first embodiment of the present invention.
Figure 12:
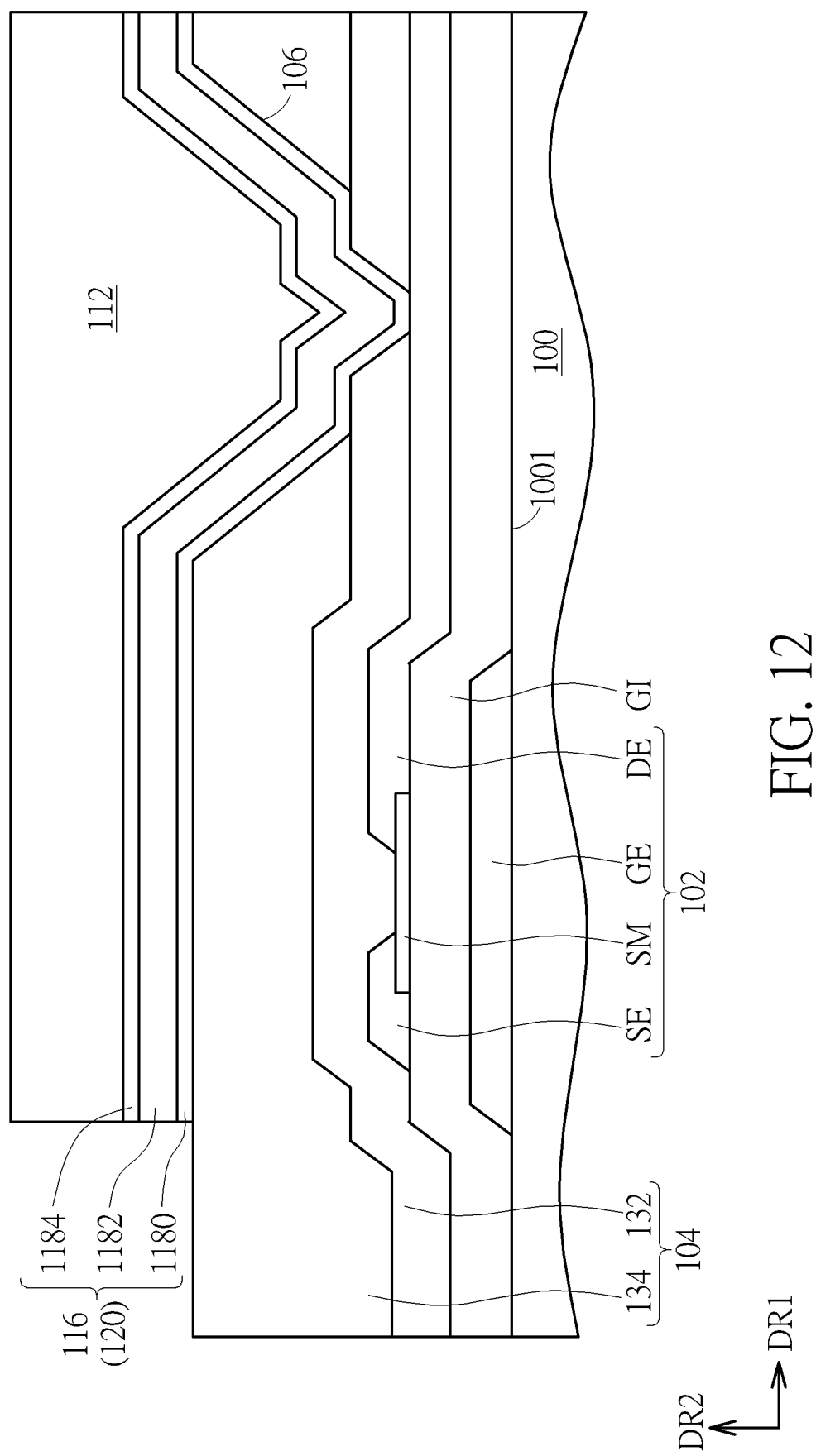

FIG. 11 may correspond to FIG. 2 and FIG. 12 may correspond to FIG. 6. In FIG. 11 and FIG. 12, a bottom gate thin film transistor is used as an example of the thin film transistor 102 in FIG. 2 and FIG. 6, but not limited thereto. In other embodiments, the thin film transistor 102 in FIG. 2 and FIG. 6 may be a top gate thin film transistor. As shown in FIG. 11, the thin film transistor 102 includes a gate GE, a semiconductor layer SM, a source SE, and a drain DE. The gate GE is disposed on the substrate 100, the semiconductor layer SM is disposed on the gate GE, and a gate insulating layer GI is disposed between the gate GE and the semiconductor layer SM. The source SE and the drain DE are disposed on the gate insulating layer GI and on two sides of the semiconductor layer SM.

The gate GE, the source SE, and the drain DE include conductive materials such as metal, but not limited thereto. The semiconductor layer SM includes a semiconductor material such as amorphous silicon, polycrystalline silicon, or metal oxide, but not limited thereto.

The insulating layer 104 may include a multi-layer structure. For example, the insulating layer 104 may include an insulating layer 132 and an insulating layer 134, but not limited thereto. The insulating layer 132 is disposed on the source SE and the drain DE, and the insulating layer 134 is disposed on the insulating layer 132. The gate insulating layer GI, the insulating layer 132, and the insulating layer 134 may include inorganic insulating materials, organic insulating materials, or combinations thereof, but not limited thereto. For example, the insulating layer 132 may include inorganic insulating materials, and the insulating layer 134 may include organic insulating materials and serve as a planarization layer, but not limited thereto. The thickness of the insulating layer 134 may be greater than the thickness of the gate insulating layer GI and the thickness of the insulating layer 132, but not limited thereto.

The through hole 106 may penetrate through the insulating layer 134 and the insulating layer 132 to expose a portion of the surface of the drain DE, and the conductive layer stack 108 may extend into the through hole 106 to electrically connect with the drain DE. For example, the first sub-layer 1100 in the conductive layer stack 108 may contact the drain DE. Next, the etching process 114 is performed to form the reflective electrode 120 as shown in FIG. 12.

Next, as shown in FIG. 9, a first alignment layer 122 is formed on the reflective electrode 120. The first alignment layer 122 can cover the reflective electrode 120 and the insulating layer 104, and the first alignment layer 122 can directly contact the second patterned sub-layer 1184.

Next, a substrate 124 is provided, a common electrode 126 and a second alignment layer 128 are formed on the substrate 124, and the common electrode 126 is disposed between the substrate 124 and the second alignment layer 128. The substrate 124 may include a rigid or flexible transparent substrate, but not limited thereto. The common electrode 126 may include the transparent conductive material, but not limited thereto.

Next, the substrate 100 and the substrate 124 are assembled, and a liquid crystal layer 130 is disposed between the substrate 100 and the substrate 124 to form the display panel 10. FIG. 1 to FIG. 3, FIG. 6, FIG. 9 and FIG. 11 to FIG. 12 are schematic cross-sectional diagrams of a pixel or a sub-pixel of the display panel 10. Each pixel or sub-pixel of the display panel 10 has a reflective region RA, and the reflective electrode 120 is located in the reflective region RA for reflecting light. The liquid crystal layer 130 may be disposed between the first alignment layer 122 and the second alignment layer 128.

As shown in FIG. 9, ambient light or a light beam LT1 of the front light module enters the display panel 10 from the substrate 124 and is reflected by the reflective electrode 120 to form a reflected light LT2, and the reflected light LT2 exits the display panel 10 through the liquid crystal layer 130 and the substrate 124 to reach the eyes of the user. In this embodiment, the display panel 10 may be a reflective display panel or a transflective display panel, but not limited thereto.

Therefore, as shown in FIG. 9, a display panel 10 of this embodiment includes the substrate 100, the substrate 124, the liquid crystal layer 130, the thin film transistor 102, the reflective electrode 120, the first alignment layer 122, and the second alignment layer 128. The substrate 124 and the substrate 100 are oppositely disposed in the direction DR2, the liquid crystal layer 130 is disposed between the substrate 100 and the substrate 124, the thin film transistor 102 is disposed between the substrate 100 and the liquid crystal layer 130, and the reflective electrode 120 is disposed between the thin film transistor 102 and the liquid crystal layer 130.

The reflective electrode 120 is electrically connected to the thin film transistor 102, and the reflective electrode 120 includes a transparent conductive layer (i.e., the first patterned sub-layer 1180), a metal layer (i.e., the third patterned sub-layer 1182), and another transparent conductive layer (i.e., the second patterned sub-layer 1184). The metal lay is disposed between two transparent conductive layers, the transparent conductive layers include indium-containing oxide, and the metal layer includes silver or silver alloy.

The display panel 10 further includes the insulating layer 104 disposed on the substrate 100 and the thin film transistor 102, and the insulating layer 104 is disposed between the reflective electrode 120 and the substrate 100. The insulating layer 104 includes a through hole 106, and the reflective electrode 120 extends into the through hole 106 to electrically connect with the thin film transistor 102.

The first alignment layer 122 is disposed between the liquid crystal layer 130 and the reflective electrode 120. The second alignment layer 128 is disposed between the substrate 124 and the liquid crystal layer 130. The display panel 10 further includes the common electrode 126 disposed between the substrate 124 and the second alignment layer 128.

The etching solution and the manufacturing method of the display panel of the present invention are not limited to the aforementioned embodiment. The following description continues to detail other embodiments. To simplify the description and show the difference between other embodiments and the above-mentioned embodiment, identical components in each of the following embodiments are marked with identical symbols, and the identical features will not be redundantly described.

Figure 13:
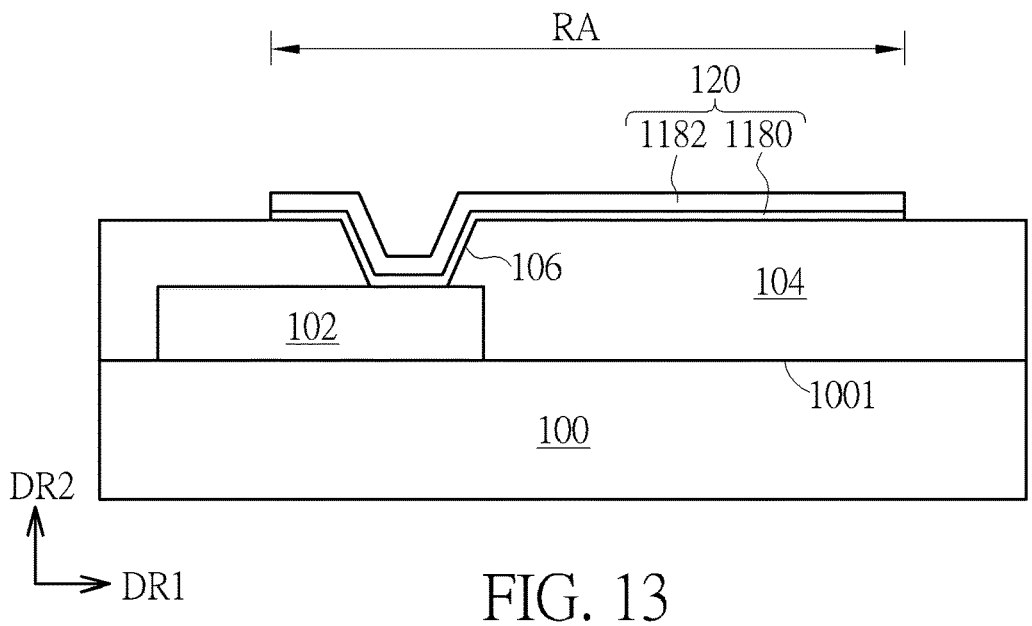
FIG. 13 is a schematic diagram illustrating a step of removing a second patterned sub-layer in a manufacturing method of a display panel according to a second embodiment of the present invention.
Figure 14:
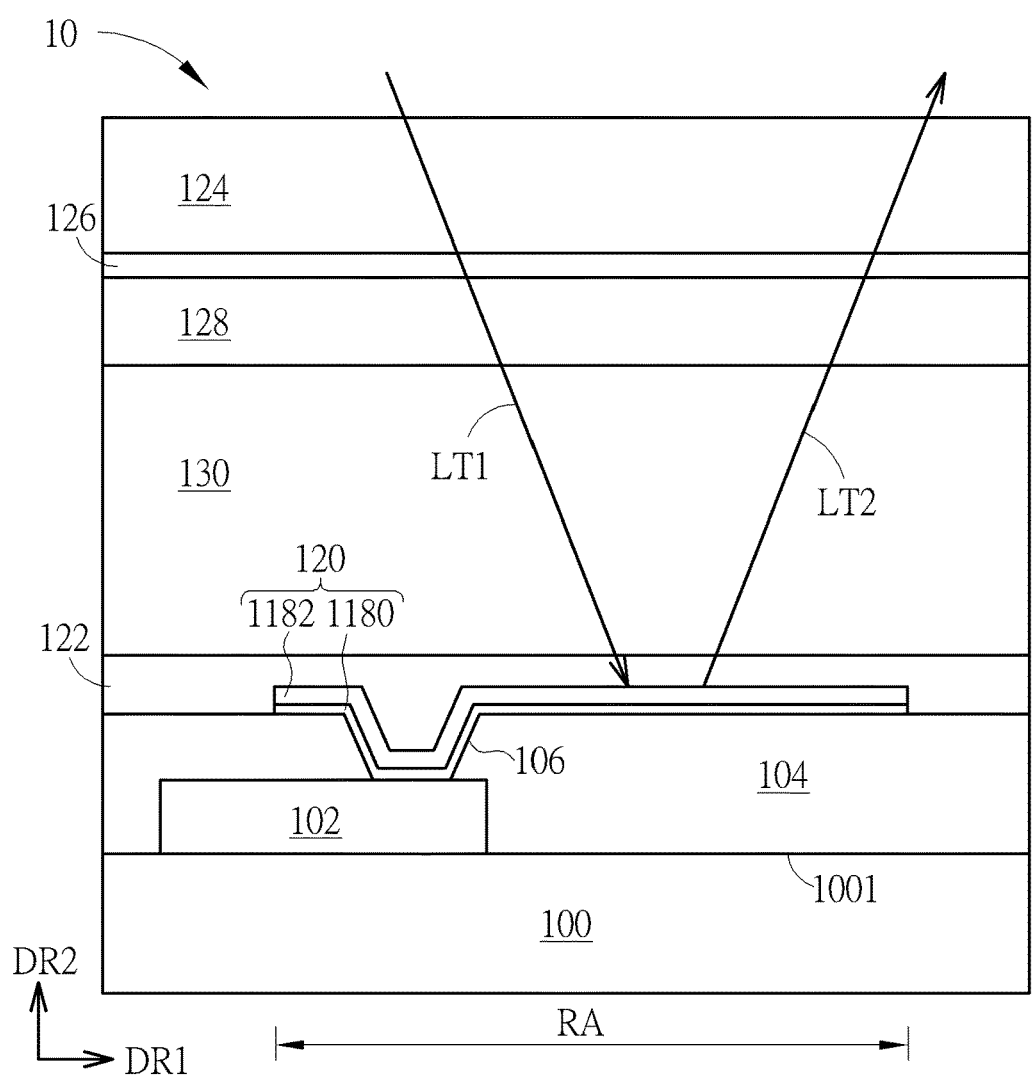
FIG. 14 is a schematic cross-sectional diagram of the display panel according to the second embodiment of the present invention.

Referring to FIG. 13 and FIG. 14, FIG. 13 is a schematic diagram illustrating a step of removing a second patterned sub-layer in a manufacturing method of a display panel according to a second embodiment of the present invention, and FIG. 14 is a schematic cross-sectional diagram of the display panel according to the second embodiment of the present invention. Different from the first embodiment, the second patterned sub-layer 1184 of the patterned conductive layer stack 116 in this embodiment can be removed to form the reflective electrode 120 after the etching process 114 of FIG. 2 is performed to form the patterned conductive layer stack 116 of FIG. 6 and the photoresist pattern 112 is removed.

The reflective electrode 120 of this embodiment includes the first patterned sub-layer 1180 and the third patterned sub-layer 1182 but does not include the second patterned sub-layer 1184. In some embodiments, the method of removing the second patterned sub-layer 1184 may include, but is not limited to, removing the second patterned sub-layer 1184 by an etching solution including oxalic acid.

Accordingly, the third patterned sub-layer 1182 in the reflective electrode 120 can be exposed and is not covered by the second patterned sub-layer 1184. Next, as shown in FIG. 14, the first alignment layer 122 is formed on the third patterned sub-layer 1182 within a specific time after the second patterned sub-layer 1184 is removed, thereby preventing the exposed surface of the third patterned sub-layer 1182 from reacting with external substances and resulting in the decrease of reflectivity and the increase of the value of b* in CIE L*a*b* color model. Therefore, in this embodiment, the first alignment layer 122 covers the third patterned sub-layer 1182 and directly contacts the third patterned sub-layer 1182.

In this embodiment, the patterning process can be performed in the presence of the second sub-layer 1104, that is, the patterning process can be performed on the conductive layer stack 108 including the first sub-layer 1100, the second sub-layer 1104 and the third sub-layer 1102. In addition, the second patterned sub-layer 1184 can be removed after the patterning process to increase the reflectivity of the reflective electrode 120 and reduce the value of b* in CIE L*a*b* color model.

Therefore, the silver in the third sub-layer 1102 and the third patterned sub-layer 1182 can be protected from reacting with the external substances before the second patterned sub-layer 1184 is removed, and the reflective electrode 120 of the display panel 10 can have a better reflectivity and a lower value of b* (which can reduce the phenomenon of yellowing image) after the second patterned sub-layer 1184 is removed, thereby improving the image quality of the display panel 10.

In this embodiment, the time from the removal of the second patterned sub-layer 1184 to the formation of the first alignment layer 122 on the third patterned sub-layer 1182 is less than or equal to twenty-one hours, and preferably less than or equal to twelve hours. Since the exposed surface of the third patterned sub-layer 1182 is easy to react with the external substances, the reflectivity of the reflective electrode 120 will be lower and the value of b* of the reflective electrode 120 will be higher (i.e., the image may be yellower) as the third patterned sub-layer 1182 is exposed for a longer time. Therefore, it is necessary to perform the subsequent process (such as disposing the first alignment layer 122) within the specific time after the second patterned sub-layer 1184 is removed, and the specific time is less than or equal to twenty-one hours, and preferably less than or equal to twelve hours.

In this embodiment, the process of removing the second patterned sub-layer 1184 to form the reflective electrode 120 does not need to use a mask, thus the cost of the process can be reduced, but not limited thereto. For example, the second patterned sub-layer 1184 can be removed (for example, the second patterned sub-layer 1184 can be removed by the etching solution including oxalic acid) after the patterning process in the step S107 is performed and the photoresist pattern 112 is removed.

In other embodiments, the process of removing the second patterned sub-layer 1184 to form the reflective electrode 120 may use a mask, but not limited thereto. For example, a photoresist pattern can be formed by the mask after the patterning process in the step S107 is performed and the photoresist pattern 112 is removed, the photoresist pattern has an opening corresponding to the reflective region RA, and the second patterned sub-layer 1184 located in the reflective region RA can be removed (for example, the second patterned sub-layer 1184 located in the reflective region RA can be removed by the etching solution including oxalic acid).

In this embodiment, the steps after the first alignment layer 122 is formed can be the same as those in the first embodiment, and the details will not be repeated here.

Figure 15:
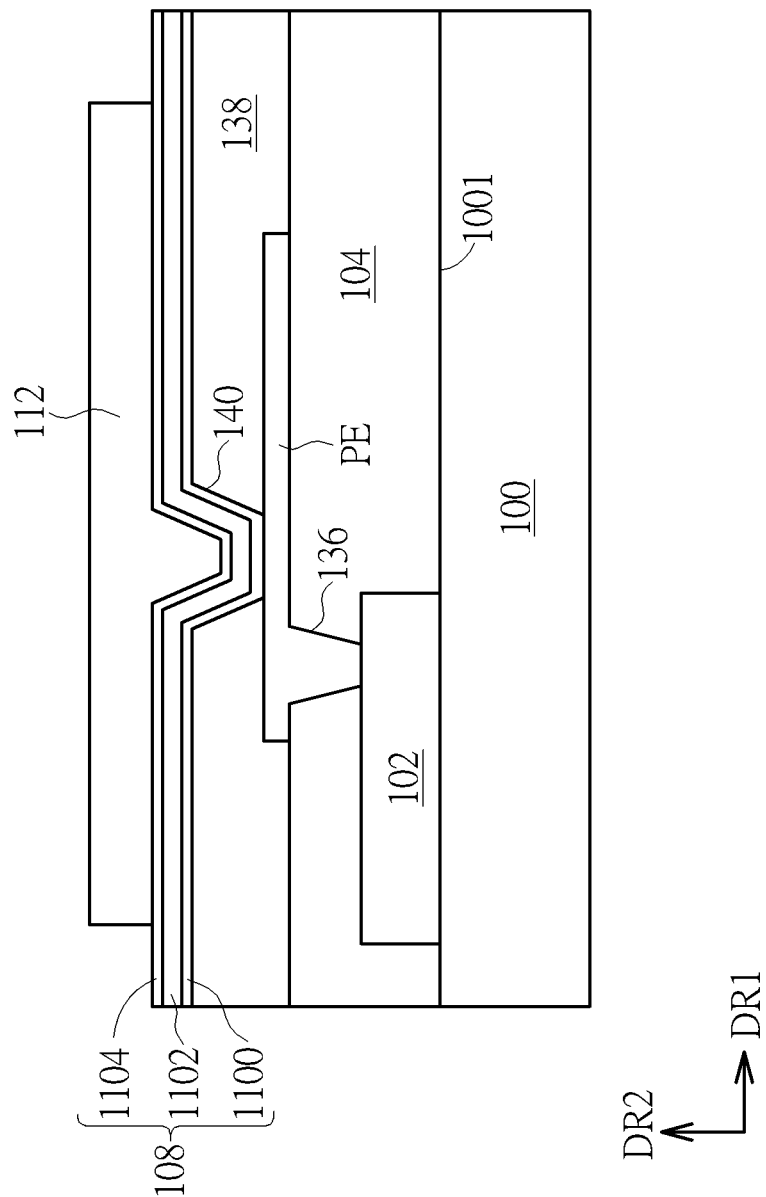
FIG. 15 is a schematic diagram illustrating a step of forming a photoresist pattern in a manufacturing method of a display panel according to a third embodiment of the present invention.
Figure 16:
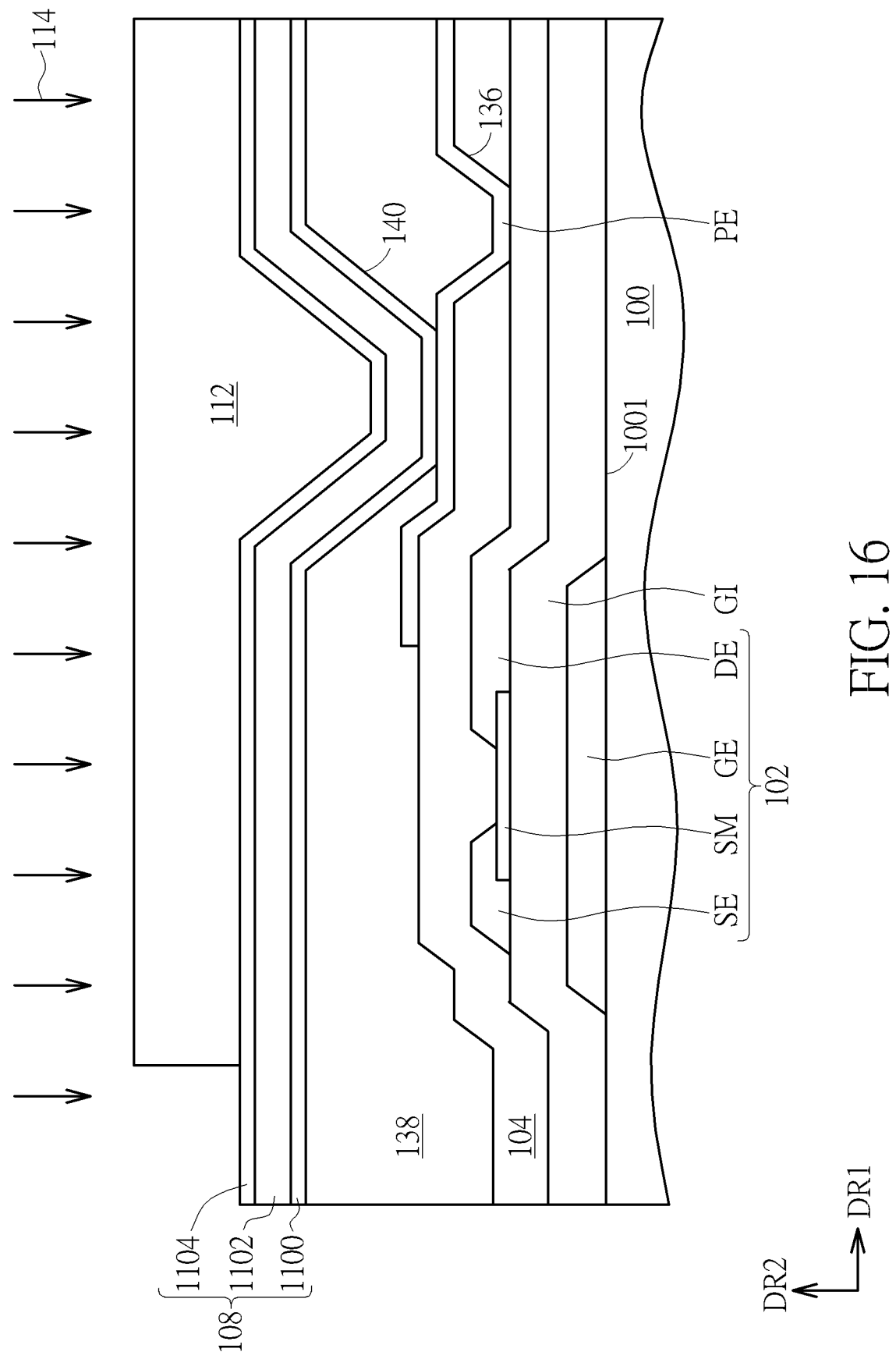
FIG. 16 and FIG. 17 are schematic diagrams illustrating an example of forming a reflective electrode according to the third embodiment of the present invention.
Figure 17:
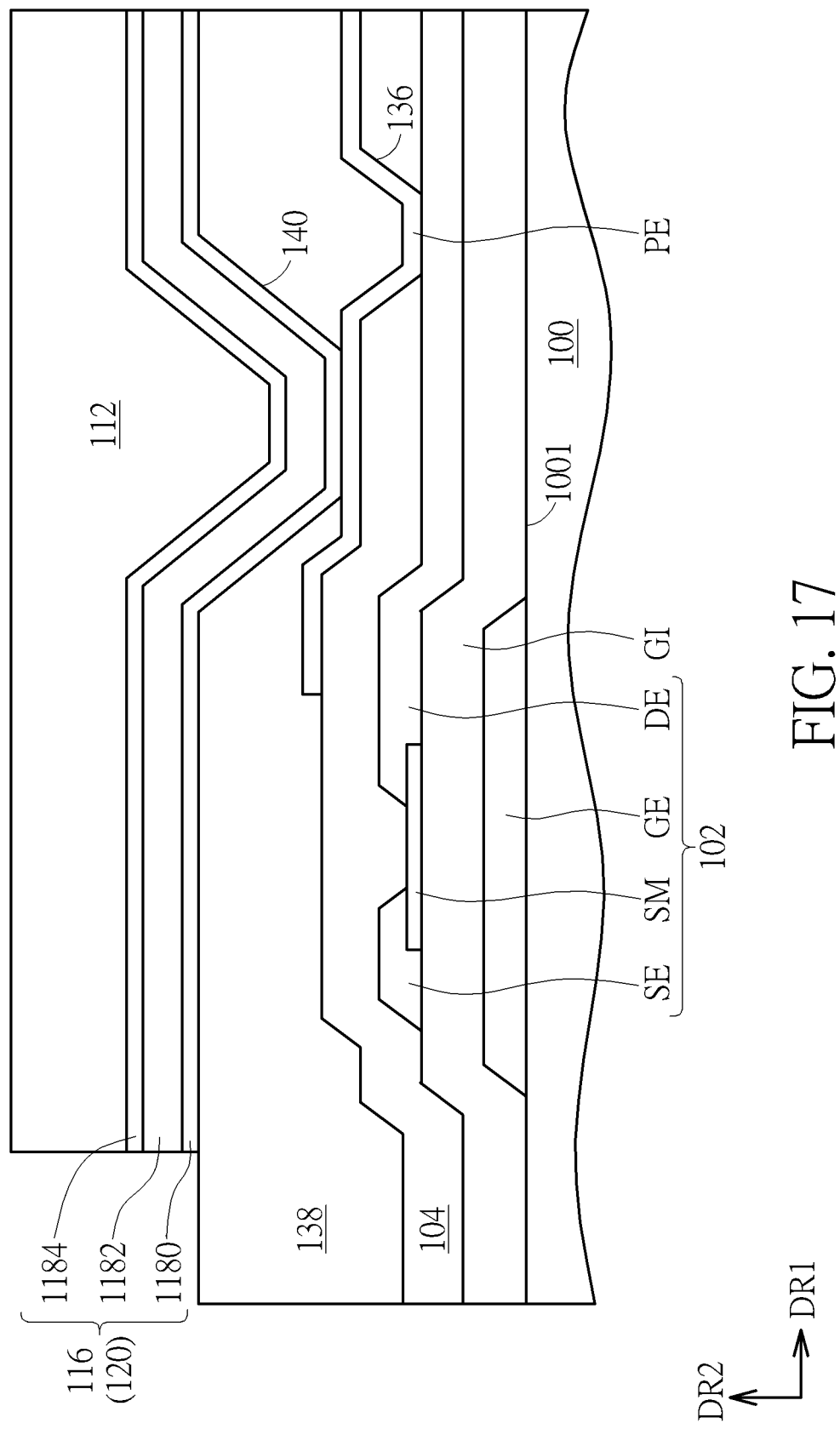

Referring to FIG. 15 to FIG. 17, FIG. 15 is a schematic diagram illustrating a step of forming a photoresist pattern in a manufacturing method of a display panel according to a third embodiment of the present invention, and FIG. 16 and FIG. 17 are schematic diagrams illustrating an example of forming a reflective electrode according to the third embodiment of the present invention.

As shown in FIG. 15, the difference between the first embodiment and this embodiment is that a through hole 136 is formed in the insulating layer 104 after the insulating layer 104 is formed. Next, a pixel electrode PE is formed on the insulating layer 104, and the pixel electrode PE is filled in the via hole 136 and is electrically connected to the thin film transistor 102. The pixel electrode PE includes the transparent conductive material, such as indium tin oxide or indium zinc oxide, but not limited thereto.

Next, an insulating layer 138 is formed on the insulating layer 104 and the pixel electrode PE, and the insulating layer 138 covers the pixel electrode PE. The insulating layer 138 may include inorganic insulating materials, organic insulating materials, combinations of the above, but not limited thereto. In addition, a through hole 140 is formed in the insulating layer 138.

Next, the conductive layer stack 108 is formed on the insulating layer 138, and the conductive layer stack 108 extends into the through hole 140 to electrically connect with the pixel electrode PE. The formation of the photoresist pattern 112 and the subsequent steps can refer to the first embodiment or the second embodiment, and it will not be repeated here.

As shown in FIG. 16, the thin film transistor 102 in FIG. 15 is illustrated as a bottom gate thin film transistor in FIG. 16, but not limited thereto. In other embodiments, the thin film transistor 102 in FIG. 15 may be a top gate thin film transistor. As shown in FIG. 16, in this example, the insulating layer 104 includes a through hole 136 which can penetrate through the insulating layer 104 and expose a portion of the surface of the drain DE, and the pixel electrode PE can be filled in the through hole 136 and electrically connected to the drain DE. For example, the pixel electrode PE may directly contact the drain DE.

The insulating layer 138 includes the through hole 140, the through hole 140 can penetrate through the insulating layer 138 and expose a portion of the surface of the pixel electrode PE, and the conductive layer stack 108 can extend into the through hole 140 to electrically connect with the pixel electrode PE. For example, the first sub-layer 1100 in the conductive layer stack 108 may directly contact the pixel electrode PE. Next, the etching process 114 is performed to form the reflective electrode 120 shown in FIG. 17.

In the above first to third embodiments, the reflective electrode 120 is located in the reflective region of the reflective display panel or the transflective display panel, and the reflective electrode 120 is used to reflect the ambient light or the light of the front light module as an example, but it is not limited thereto. In other embodiments, the reflective electrode can be disposed in the organic light emitting diode display panel and can be used to reflect the light generated by the light emitting layer of the organic light emitting diode. Therefore, the manufacturing method of the reflective electrode 120 and the etching solution used for forming the reflective electrode 120 described above can also be applied to form the reflective electrode in the organic light emitting diode display panel, and it will not be described in detail here again.

In summary, the etching solution of the present invention includes 1 to 3 wt % of nitric acid, 30 to 50 wt % of acetic acid, 30 to 50 wt % of phosphoric acid, and the remaining amount of water based on the total weight of the etching solution. In the manufacturing method of the display panel of the present invention, the etching solution can be used for etching the conductive layer stack to form the patterned conductive layer stack. The etching process is one-step etching, and the etching process etches the first sub-layer (including molybdenum), the second sub-layer (including indium-containing oxide), and the third sub-layer (including silver or silver alloy) of the conductive layer stack together to form the first, second, and third patterned sub-layers of the patterned conductive layer stack. Through the etching process of the present invention and disposing the first sub-layer containing molybdenum under the third sub-layer containing silver, the damage of the edge of the silver layer of the patterned conductive layer stack can be effectively suppressed, and the silver particles on the edge of the patterned conductive layer stack can also be effectively suppressed. The reflective electrode at least includes the first patterned sub-layer and the third patterned sub-layer of the patterned conductive layer stack. Through the etching solution and the etching process described above, the reflection effect of the reflective electrode can be improved, and the display quality of the display panel can be improved. In some embodiments, the second patterned sub-layer may be removed. In this way, the reflectivity of the reflective electrode can be further improved, and the value of b* in CIE L*a*b* color model can be decreased and the yellowing phenomenon of the image can be mitigated, thus the image quality of the display panel can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A manufacturing method of a display panel, comprising:
   providing a substrate;
   forming a conductive layer stack on the substrate, wherein the conductive layer stack comprises:
   a first sub-layer, wherein the first sub-layer comprises molybdenum;
   a second sub-layer disposed on the first sub-layer, wherein the second sub-layer comprises a transparent conductive material, and the transparent conductive material comprises indium-containing oxide; and
   a third sub-layer disposed between the first sub-layer and the second sub-layer, wherein the third sub-layer comprises silver or silver alloy;
   forming a photoresist pattern on the conductive layer stack; and
   performing an etching process on the conductive layer stack, wherein an etching solution is used for etching the first sub-layer, the second sub-layer, and the third sub-layer in the etching process to form a first patterned sub-layer, a second patterned sub-layer, and a third patterned sub-layer,
   wherein the etching solution comprises 1 to 3 wt % of nitric acid, 30 to 50 wt % of acetic acid, 30 to 50 wt % of phosphoric acid, and a remaining amount of water.

2. The manufacturing method of the display panel according to claim 1, wherein a temperature of the etching solution is greater than or equal to 26 degrees Celsius and less than or equal to 35 degrees Celsius.

3. The manufacturing method of the display panel according to claim 1, wherein the display panel comprises a reflective region, and the first patterned sub-layer, the second patterned sub-layer, and the third patterned sub-layer are located in the reflective region of the display panel.

4. The manufacturing method of the display panel according to claim 1, further comprising removing the photoresist pattern after the etching process is performed and removing the second patterned sub-layer after the photoresist pattern is removed.

5. The manufacturing method of the display panel according to claim 4, further comprising forming a first alignment layer on the third patterned sub-layer within a specific time after the second patterned sub-layer is removed, wherein the first alignment layer is in direct contact with the third patterned sub-layer.

6. The manufacturing method of the display panel according to claim 5, wherein the specific time is less than or equal to 21 hours.

7. The manufacturing method of the display panel according to claim 1, wherein the indium-containing oxide comprises indium tin oxide or indium zinc oxide.

8. The manufacturing method of the display panel according to claim 1, wherein the etching process etches the conductive layer stack in one step.

9. An etching solution used for performing an etching process on a conductive layer stack of a display panel to form a patterned conductive layer stack, comprising:
   1 to 3 wt % of nitric acid;
   30 to 50 wt % of acetic acid;
   30 to 50 wt % of phosphoric acid; and
   a remaining amount of water,
   wherein the conductive layer stack comprises a first sub-layer, a second sub-layer, and a third sub-layer, and the third sub-layer is disposed between the first sub-layer and the second sub-layer, the patterned conductive layer stack comprises a first patterned sub-layer, a second patterned sub-layer, and a third patterned sub-layer, and the third patterned sub-layer is disposed between the first patterned sub-layer and the second patterned sub-layer, the first sub-layer, the second sub-layer, and the third sub-layer are etched by the etching solution in the etching process to form the first patterned sub-layer, the second patterned sub-layer, and the third patterned sub-layer, wherein the first sub-layer and the first patterned sub-layer comprise molybdenum, the second sub-layer and the second patterned sub-layer comprise a transparent conductive material, the transparent conductive material comprises indium-containing oxide, and the third sub-layer and the third patterned sub-layer comprise silver or silver alloy.

10. The etching solution according to claim 9, wherein the etching process etches the conductive layer stack in one step.

11. The etching solution according to claim 9, wherein a temperature of the etching solution is greater than or equal to 26 degrees Celsius and less than or equal to 35 degrees Celsius.

12. The etching solution according to claim 9, wherein the indium-containing oxide comprises indium tin oxide or indium zinc oxide.

13. The etching solution according to claim 9, wherein the display panel comprises a reflective region, and the patterned conductive layer stack is located in the reflective region of the display panel.

\* \* \* \* \*